US009969108B2

(12) United States Patent
Youngblood et al.

(10) Patent No.: US 9,969,108 B2
(45) Date of Patent: May 15, 2018

(54) METHOD OF FORMING A CELLULOSE NANOCRYSTALLINE FILM

(71) Applicants: PURDUE RESEARCH FOUNDATION, West Lafayette (IN); THE UNITED STATES OF AMERICA AS REPRESENTED BY THE SECRETARY OF AGRICULTURE, Washington, DC (US)

(72) Inventors: Jeffrey P. Youngblood, Crawfordsville, IN (US); Robert J. Moon, Marietta, GA (US); Alex Reising, Lafayette, IN (US)

(73) Assignees: PURDUE RESEARCH FOUNDATION, West Lafayette, IN (US); THE UNITED STATES OF AMERICA AS REPRESENTED BY THE SECRETARY OF AGRICULTURE, Washington, DC (US)

( * ) Notice: Subject to any disclaimer, the term of this patent is extended or adjusted under 35 U.S.C. 154(b) by 353 days.

(21) Appl. No.: 15/045,802

(22) Filed: Feb. 17, 2016

(65) Prior Publication Data
US 2016/0176075 A1    Jun. 23, 2016

Related U.S. Application Data

(60) Division of application No. 13/855,119, filed on Apr. 2, 2013, now Pat. No. 9,296,131, which is a continuation of application No. PCT/US2011/056098, filed on Oct. 13, 2011.

(60) Provisional application No. 61/392,520, filed on Oct. 13, 2010.

(51) Int. Cl.
| B29C 41/00 | (2006.01) |
| C08L 1/02 | (2006.01) |
| B29C 70/14 | (2006.01) |
| B29C 41/50 | (2006.01) |
| B29C 41/24 | (2006.01) |
| B29C 55/00 | (2006.01) |
| C08J 5/18 | (2006.01) |
| C08B 15/08 | (2006.01) |
| B29K 1/00 | (2006.01) |
| B29K 105/16 | (2006.01) |

(52) U.S. Cl.
CPC ............ *B29C 41/003* (2013.01); *B29C 41/24* (2013.01); *B29C 41/50* (2013.01); *B29C 55/00* (2013.01); *B29C 70/14* (2013.01); *C08B 15/08* (2013.01); *C08J 5/18* (2013.01); *C08L 1/02* (2013.01); *B29K 2001/00* (2013.01); *B29K 2105/162* (2013.01); *B29K 2995/0077* (2013.01); *C08J 2301/02* (2013.01); *C08J 2301/12* (2013.01)

(58) Field of Classification Search
CPC .... B29C 41/003; B29C 41/50; B29K 2001/00
USPC .................. 264/28, 101, 108, 299
See application file for complete search history.

(56) References Cited

U.S. PATENT DOCUMENTS

| 5,629,055 A | 4/1997 | Revol et al. |
| 6,967,027 B1 | 11/2005 | Heux et al. |
| 7,163,723 B2 | 1/2007 | Tanaka et al. |
| 2005/0266159 A1 | 12/2005 | Lee et al. |
| 2010/0148118 A1 | 6/2010 | Beck et al. |
| 2010/0151159 A1 | 6/2010 | Beck et al. |
| 2010/0279019 A1 | 11/2010 | Beck et al. |
| 2012/0237750 A1 | 9/2012 | Zou et al. |

OTHER PUBLICATIONS

Reasing, Alexander B. Development, Processing, and Characterization of Cellulose Nanocrystal Neat Films; Purdue University; Dec. 2012.
Godinho M.H. et al., Liquid crystalline cellulose derivative elastomer films under uniaxial strain, Cellulose, 2009, vol. 16, pp. 199-205; See abstract and conclusion.
International Search Report and Written Opinion of the International Searching Authority, dated May 15, 2012.

*Primary Examiner* — Atul P. Khare
(74) *Attorney, Agent, or Firm* — Taft Stettinus & Hollister LLP; Stephen F. Rost

(57) ABSTRACT

A method is provided for forming a substantially uniaxially-oriented, high content cellulose nanocrystal film. The method includes providing a plant-biomass-based suspension of cellulose nanocrystals and altering the pH of the cellulose nanocrystals to a substantially neutral pH. The suspension is sheared at a shearing rate. The method further includes orienting the cellulose nanocrystals in a substantially axial direction and removing water from the sheared cellulose nanocrystal suspension. As a result, a substantially uniaxially-oriented cellulose nanocrystal film is formed.

14 Claims, 7 Drawing Sheets

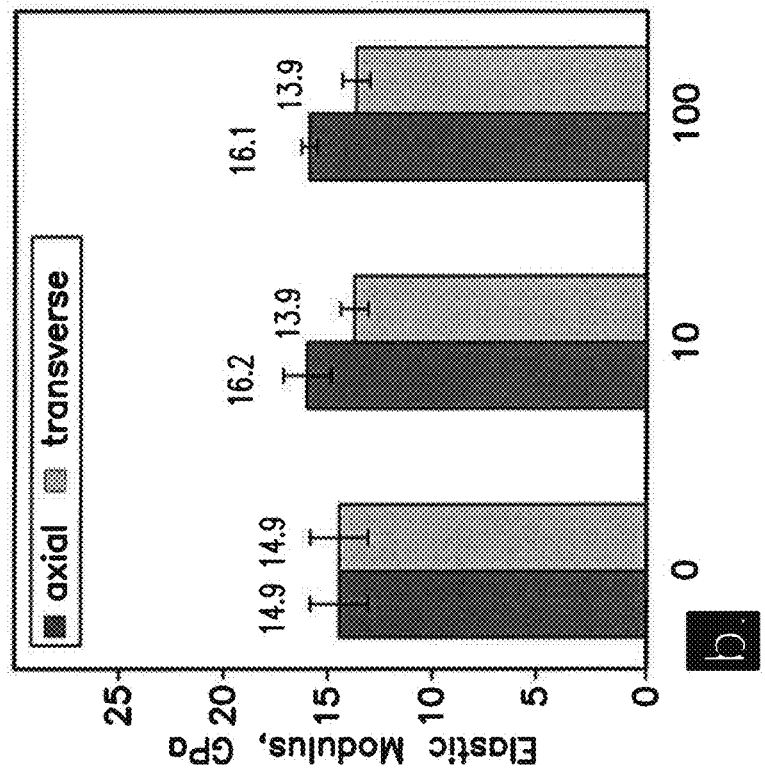
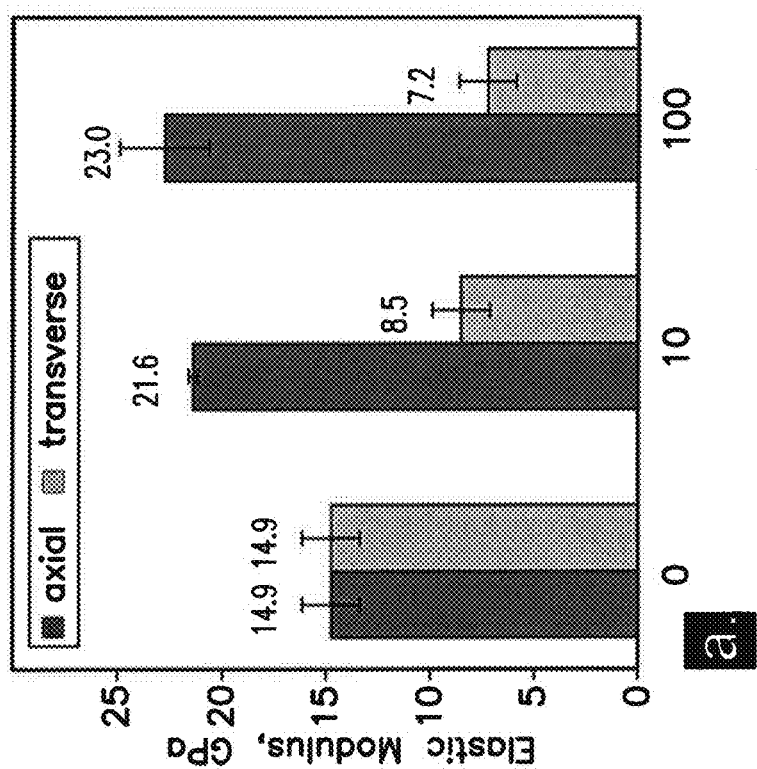
FIG. 3a
FIG. 3b

METHOD OF FORMING A CELLULOSE NANOCRYSTALLINE FILM

RELATED APPLICATIONS

This application is a divisional application of U.S. patent application Ser. No. 13/855,119, filed on Apr. 2, 2013, which is a continuation application of International Application Serial No. PCT/US2011/056098, filed on Oct. 13, 2011, which claims the benefit of U.S. Provisional Patent Application Ser. No. 61/392,520, filed Oct. 13, 2010, which are hereby incorporated by reference in their entirety.

GOVERNMENTAL SUPPORT INFORMATION

This invention was made in part with support from the United States Department of Agriculture Forest Service through agreement number 070CR-111111120-093. The Government therefore has certain rights in the invention.

BACKGROUND

The present disclosure generally relates to a cellulose nanocrystal, and in particular, to a method of forming a substantially uniaxially-oriented high content cellulose nanocrystal film with improved characteristics and properties.

According to the United States Department of Energy and Agriculture, approximately one billion tons of biomass, i.e., any biologically derived material, can be produced annually in the United States. Cellulose, the world's most abundant natural, renewable, biodegradable polymer, can be used to strengthen plastics, provide a lightweight component and advantageously is biodegradable. Cellulose nanocrystals (CNC), which are the primary structural unit for plant life, can be extracted from plant biomass (e.g., trees, grasses, cotton, sisal, bamboo and ramie). Cellulose nanocrystals can also be found as structural components in tunicates (sea creature similar to sea cucumbers), and are produced naturally by the acetobacter xylinum bacteria. In addition to being used in plastics, the cellulose nanocrystals can be used in ceramics and in biomedical applications such as artificial joints and disposable medical equipment. These nanocrystals provide several advantages over glass including being lighter weight, easier on processing machinery, less expensive to work with, and breaks down quickly in a landfill, for example.

Due to the inexpensive, renewable nature of cellulose nanocrystals, as well as their exceptional mechanical properties, their use as a reinforcement phase in polymer based composites has been a popular topic of recent research. However, a majority of the current research has focused on low fractions of cellulose nanocrystals, typically less than 20 wt. %, to improve the properties of various polymers. The high modulus of the cellulose nanocrystals suggests that CNC phase-dominant composites (>50 wt. %) could serve potential high-strength applications, as well as an increased "green" aspect.

CNC morphology (length, aspect ratio, length polydispersity) and surface charge vary greatly based on synthesis conditions. Typically, acid hydrolysis is used to break down cellulose microfibrils by digesting the amorphous regions that connect cellulose nanocrystals. The overall process typically requires heating, agitation, rinsing, filtration, dialysis, and ultrasonication, with the parameters of each step having a direct impact on CNC morphology and/or surface chemistry. Therefore, researchers have attempted to determine the effects of each processing step on cellulose nanocrystal properties. The final result of CNC processing is almost always the same, in that a suspension of colloidal liquid crystalline cellulose nanocrystals is produced, forming either a nematic or chiral nematic mesophase (dependant on CNC length, aspect ratio, length polydispersity, surface charge, CNC concentration, and electrolyte concentration).

Another area of recent CNC research has focused on orienting cellulose nanocrystals in suspension, over large domain sizes as opposed to the small domains of orientation that develop due to mesophase formation. Several methods of inducing orientation have been investigated, generally involving either a large magnetic field or electric field. The magnetic and electric field options can require significant energy input that detracts from the "green" aspect of cellulose. In addition, magnetic fields do not orient individual cellulose nanocrystals uniaxially, but instead orient the chiral nematic domain axes of the CNC mesophase (with cellulose nanocrystals oriented perpendicular to magnetic field lines).

Most conventional processes for forming a CNC film use a high quality tunicate or bacterial nanocrystal, rather than plant-biomass-based, because the former are pure, have greater length, and are easier to obtain. In addition, cellulose nanocrystals derived from wood generally display worse behavior, e.g., are more difficult to orient. Further, past research using cellulose nanocrystals derived from tunicate or bacteria has produced advantageous mechanical properties including strength and modulus.

Once formed, retaining CNC uniaxial orientation induced during a shear casting process in the final dried CNC film is challenging. A time- and rheology-dependant relaxation occurs once shear is removed and the uniaxial CNC orientation dissipates. To counter this relaxation, conventional CNC films have been dried under a constant rotational shearing process and achieved better uniaxial orientation. However, these dried films are cylindrical, which severely limits potential applications and complicates mechanical property characterization. Other conventional processes have used drawing methods to pull a semi-dry film of bacterial cellulose fiber into alignment and held the strain during a drying process. This conventional process has produced a uniaxial orientation in a flat film, but has been most effective for high aspect ratio (<100) fibers that produce a CNC gel-like network structure that can be mechanically deformed in the wet state.

Thus, there is a need for an industrially-relevant process of forming a flat, highly oriented film of high content readily available cellulose nanocrystals extracted from plant biomass. In addition, there is a need for a shear-based orientation process for forming the plant-biomass-based cellulose nanocrystalline film. Once formed, the mechanical properties of the highly oriented CNC film can then be used for potential applications in high-strength composites manufacturing.

SUMMARY

In one exemplary embodiment, a method is provided for forming a substantially uniaxially-oriented, high content cellulose nanocrystal film. The method includes providing a plant-biomass-based suspension of cellulose nanocrystals and altering the pH of the cellulose nanocrystals to a substantially neutral pH. The suspension is sheared at a shearing rate. The method further includes orienting the cellulose nanocrystals in a substantially axial direction and removing water from the sheared cellulose nanocrystal suspension. A substantially uniaxially-oriented cellulose nanocrystal film is formed.

In one aspect, the suspension is provided in a liquid crystalline form. In another aspect, the shearing step comprises using a doctor blade for shearing. The shearing rate can be about $100 \cdot s^{-1}$ and $10 \cdot s^{-1}$. The altering step of the method can also include adding a base material to the suspension and increasing the pH of the suspension until the pH is substantially neutral. The base material can be sodium hydroxide or iron hydroxide.

In the exemplary method, after the increasing step, the pH of the cellulose nanocrystal suspension can be between about 4-10. The method can further include dialyzing the suspension to remove the base from the suspension. In addition, the forming step comprises forming a substantially flat and continuous film.

In another embodiment, a method is provided of forming a substantially uniaxially-oriented, high content cellulose nanocrystal film for a commercial application. The method includes providing a cellulose nanocrystal suspension derived from plant-biomass-based material, where the concentration of the cellulose nanocrystals is above the lyotropic limit; adjusting the pH of the suspension to a substantially neutral pH; shearing the suspension at a shearing rate; removing water from the sheared cellulose nanocrystal suspension; and forming a substantially uniaxially-oriented cellulose nanocrystal film. The method can include adding a hydrophobic agent to the suspension such as an epoxydyzed soybean oil or elastomer material.

In one aspect, the method includes controlling the viscosity of the suspension by providing the suspension with a concentration between about 3 wt. % and 15 wt. %. In another aspect, the adjusting step of the method comprises adding a base material to the suspension. In a further aspect, the removing step includes cooling the sheared cellulose nanocrystal suspension to a temperature at or above its freezing point and applying a vacuum to the cooled suspension for a period of time, such that the period of time is minimized to maintain orientation of the cellulose nanocrystals in the formed film.

In the method, the shearing step includes using a doctoring blade at a shear rate of between $100 \cdot s^{-1}$ and $10 \cdot s^{-1}$. In one embodiment, the Herman's order parameter of the formed cellulose nanocrystal film is about 0.5 or greater. In another embodiment, the formed cellulose nanocrystal film comprises a tensile strength between about 250-350 MPa. In an alternative embodiment, the formed cellulose nanocrystal film comprises an elastic modulus between about 30-60 GPa. In yet another embodiment, the formed cellulose nanocrystal film comprises a strain-to-failure yield of approximately 10 times greater than that of glass.

In addition to the advantages described above, another advantage of the formed cellulose nanocrystal film is the use of plant-biomass-based cellulose nanocrystals. In spite of the physical differences (e.g., aspect ratio, length, etc.) between plant-biomass-based cellulose nanocrystals and other nanocrystals (e.g., tunicate), the plant-biomass-based cellulose nanocrystal film can achieve high strengths and stiffness for use in commercial applications. Unlike tunicate and bacterial cellulose nanocrystals, which are difficult to produce commercial or industrial scale quantities thereof, the exemplary methods of the present disclosure can be incorporated in industrial applications. For example, the film can be substantially flat and rolled as it dries and is removed from a bed.

The cellulose nanocrystal film produced by the exemplary methods can be substantially transparent (i.e., optically clear) which has its advantages in various commercial applications. The described methods of this disclosure can achieve high orientation, based on Herman's orientation parameter, and achieve approximately ten times the strain-to-failure of glass.

Other advantages include adding a protective coating to reduce the effects of water altering or affecting the orientation of the nanocrystals. The coating can be an epoxydyzed soybean oil which is renewable in that it comprises cellulose and soybean oil.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIGS. 3a and 3b are charts illustrating axial and transverse elastic moduli of (a) CNC-S and (b) CNC-L films with respect to shear rate;

Corresponding reference numerals are used to indicate corresponding parts throughout the several views.

DETAILED DESCRIPTION

Figure 1:
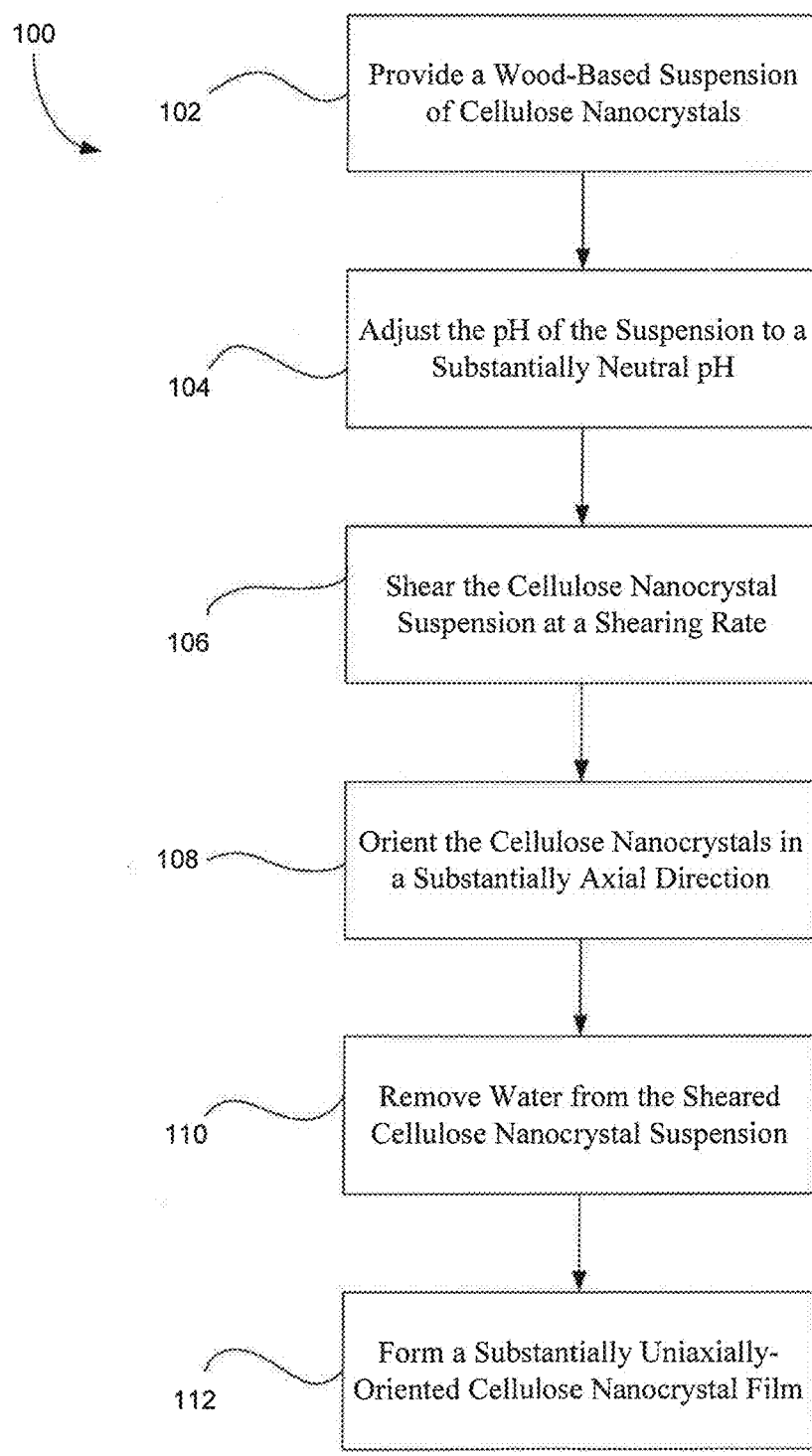
FIG. 1 is an exemplary method of forming a cellulose nanocrystal film.

An exemplary embodiment of an industrial process for forming a cellulose nanocrystal film is shown in FIG. 1. The process 100 is desirably an industrial-friendly process which can be implemented in a laboratory, factory, or any common work facility. One of the advantages of the process is its ability to performed in an industrial setting and produce commercially-viable CNC films. The CNC film can be used as a reinforcement material, for example, or for other known commercial applications.

In one aspect of the process 100, a first step 102 is to provide a plant-biomass-based suspension of cellulose nanocrystals. The cellulose nanocrystals can be extracted from any plant material such as grass, trees, cotton, etc. The CNCs are advantageously biodegradable. In addition, any size or length can be used for the purposes of the process 100. Examples of different cellulose nanocrystal suspensions and their respective sizes are described below, including the effects of aspect ratio, length, density, etc. As described below, the length of the cellulose nanocrystals can be determined by the amount of time the crystals spend in a hydrolysis process.

In the process 100, the cellulose nanocrystal suspension can be dispensed along a processing table or bed which moves or causes the liquid nanocrystals to flow from one end of the table or bed to the other. The size, shape and length of the bed can differ. The actual setup or layout of how the process is carried out can be achieved by any known means.

As will be further described below, the process 100 can include a step 104 of adjusting the pH of the suspension to a desirable pH. In one instance, the pH can be adjusted to a substantially neutral state. In another instance, the pH may be adjusted more acidic or basic. This may depend on the initial pH of the suspension. To adjust the pH in step 104, a base material can be added to the suspension to increase the pH. It has been found in some studies that the initial pH of the cellulose nanocrystals is more acidic, but by adding a base material to increase the pH to a substantially neutral pH, e.g., a pH between 4-10, the orientation and mechanical properties of the nanocrystals can be easier to control and are improved.

While conventional processes of forming a nanocrystal film may consider the pH of the crystals, these conventional processes do not purposefully add a base material to adjust the pH and achieve improved properties. In step 104, an impurity or base material is added to the cellulose nanocrystal suspension and then the combination is dialyzed such that the base is substantially removed therefrom. Alternatively, the base material may also be left and not removed by hydrolysis. In one particular embodiment, the suspension may be dialyzed until pure and then neutralized by adding the base material until a pH of approximately 7 is achieved. Experimental results, as described below, have found the resulting pH of the nanocrystals to be substantially neutral and in the range of approximately 4-10. A pH above and below this range is possible and may still lead to the advantageous results uncovered by the inventive process described in this disclosure.

An example of a base material that can be added in step 104 includes potassium hydroxide, sodium hydroxide, ammonium hydroxide, or any other known base material. Another advantage of the present disclosure is that by adjusting the pH in step 104, the resulting cellulose nanocrystal film is at least partially transparent. Since cellulose nanocrystals are naturally acidic, when or if the film is heated the acidity of the nanocrystals causes the film to turn dark and non-transparent and can weaken the mechanical properties of the film. In contrast, when the nanocrystals are substantially neutral and the film is heated, the film remains at least partially transparent without any degradation of its mechanical properties.

Once the pH is adjusted in step 104, the cellulose nanocrystal suspension is sheared at a shearing rate. Shear-based methods, including process 100, can provide a more environmentally-friendly means for orienting cellulose nanocrystals uniaxially in a suspension. In step 106, the cellulose nanocrystals flow or move along a substantially flat surface, for example, and a doctoring blade shears the outer surface of the film in an axial direction.

The shearing step 106 can be performed at a shear rate of between $100 \cdot s^{-1}$ and $10 \cdot s^{-1}$. Other shear rates are possible, but these rates were performed in the experiments described below. Any type of shearing blade can be used to perform the shearing of the film. In an advantageous embodiment, it is desirable to produce a continuous film sheet for commercial applications, and therefore a round bowl or drum is avoided in this instance. It is also easier to shear the film in the axial direction when a substantially flat surface is used for guiding the cellulose nanocrystal film.

The shearing step 106 of process 100 can have a significant effect on the orientation of the cellulose nanocrystals, and thereby the overall mechanical properties of the film. Experimentation and studies have found that orientation influences the elastic modulus of the film, which may be due to better interfacial contact of the crystals and increased density of the films. The effect on elastic modulus may also be a result of the higher orientation of the cellulose nanocrystals. The cellulose nanocrystal elastic modulus can be highest along its longer axis, so when films are tested in the direction of the cellulose nanocrystal orientation, higher elastic modulus is measured. The higher orientation of the cellulose nanocrystal particles within the film, the higher the elastic modulus will likely be in the direction of the cellulose nanocrystal particle orientation. The elastic modulus is lower than that of the random cellulose nanocrystal orientated film when tested orthogonal to the cellulose nanocrystal particle orientation. The shear rate can also have a greater impact on shorter length cellulose nanocrystals than longer cellulose nanocrystals. This will be explained in further detail below with respect to the experimental results, and also as shown in FIGS. 3a and 3b.

In step 108 of process 100, the cellulose nanocrystals are oriented in a substantially axial direction. Step 108 can be a result of the shearing step 106, but also by providing the cellulose nanocrystal suspension with a sufficient concentration to stay above the lyotropic limit. Since a cellulose nanocrystal is naturally formed as a rod-like structure, the shearing step 106 allows for higher orientation to be achieved. Therefore, step 108 can be performed by selecting a plant-biomass-based cellulose nanocrystal suspension having a concentration above the lyotropic limit and further shearing the nanocrystals during the formation of the film. In addition, and as will be explained further below, the pH of the suspension can be adjusted to achieve better orientation in the axial direction.

Another factor in controlling orientation of the cellulose nanocrystals is the performance of step 110. In step 110, the water portion of the film is removed before the crystals can reorient or become disoriented. To achieve or maintain the orientation, it is desirable to minimize the length of time the water particles are removed from the CNC film. Water particles can be removed from the film in a variety of ways, including evaporation, vacuum, applying heat, etc. For example, in one aspect, the temperature of the film can be reduced to at or slightly above its freezing point, and subsequently a vacuum can be applied to the film. By reducing the temperature of the film before applying the vacuum, the movement of the nanocrystals is slowed to reduce possible reorientation.

In another aspect, the film can air dry such that the water particles evaporate from the film. In a different aspect, the film can be moved into a different space where the relative humidity is adjusted to promote quicker evaporation. In a further aspect, heat, such as infrared heat, can be exposed to the film to initiate removal of the water particles. The process 100 does not have a preferred method for removing water particles, and other known methods that are commercially applicable may be used so long as the orientation of the cellulose nanocrystals is maintained following the shearing step 106.

Once the water particles are removed from the film in step 110, the cellulose nanocrystal film is formed in step 112. Advantageously, the film can be substantially flat and then rolled for commercial use. The film can be used as a reinforcement material or for any desirable commercial use. Once formed, the film comprises a high content cellulose nanocrystal film. For purposes of this disclosure, high content can refer to greater than 50%. In some embodiments, the film may be approximately 100% cellulose nanocrystal film, whereas in other embodiments it will be between a 50% and 100% cellulose nanocrystal film.

There are several properties associated with the cellulose nanocrystals which can affect the orientation and mechanical properties of the CNC film before, during, and following the process 100. As described above, one such property is the concentration of the suspension. It can be desirable to provide the suspension of cellulose nanocrystals at a sufficient concentration such that the cellulose nanocrystals are above its lyotropic limit, i.e., in a liquid crystalline form. Concentration has been found to be somewhat dependent on the type of cellulose nanocrystal, and in particular, its properties. For instance, a cellulose nanocrystal having a greater length may require a lower concentration than a shorter cellulose nanocrystal. Alternatively, a cellulose nanocrystal having a higher charge may require a lower concentration than a lower charged cellulose nanocrystal.

The concentration of the cellulose nanocrystal can affect the viscosity and its ability to be effectively processed. It can be desirable to provide cellulose nanocrystals with substantially low viscosity, as a gel-like or petroleum-like substance can be difficult to process. In some instances, it has been found that a higher concentration can make the cellulose nanocrystals difficult to process, as these crystals form a gel-like substance that is difficult to shear and maintain orientation. As such, a lower concentration of cellulose nanocrystals can be easier to shear and processed into a film-like material. A lower concentration also allows the liquid to self-level with a processing bed, for example, such that as the liquid is sheared the material is not deformed by the shearing blade.

As an example only, it can be desirable to have a concentration between 3 wt % and 15 wt %. More importantly, it is desirable to pack or group the cellulose nanocrystals together in a single direction to prevent disorientation. Once the cellulose nanocrystal film is dried, i.e., water particles evaporate from the sheared cellulose nanocrystals, there can be a tendency for the nanocrystals to disorient if not packed compactly. It can be easier to pack the nanocrystals tightly when provided in a crystalline form, and therefore the cellulose nanocrystal suspension is provided at a sufficient concentration to be above the lyotropic limit. In at least one instance, it can be desirable to provide the cellulose nanocrystal suspension in a glassy phase of liquid crystallinity.

Although not shown in process 100, another possible step is the addition of a hydrophobic material to the cellulose nanocrystal film. Cellulose nanocrystals tend to have a low coefficient of thermal expansion in the axial direction. When the film is mostly dry, the film has greater strength due to hydrogen bonding effects in water. In other words, when the film is wet or immersed in water, the hydrogen molecules can disperse from the crystals thereby weakening the film and causing the nanocrystals to disorient. As such, it can be desirable to protect the film from water and one way to do so is to provide a protective, hydrophobic coating over the film which opposes water. In one non-limiting example, the protective coating can be an epoxydyzed soybean oil coating which is advantageously formed of renewable resources, i.e., cellulose and soybean oil. An elastomer material may also be used as a protective coating in a different aspect. The hydrophobic coating can be applied to both the cellulose nanocrystals before shear and to the film after shear.

The cellulose nanocrystal film formed by the process 100 shown in FIG. 1 has many mechanical advantages and properties. For instance, the film is capable of achieving a Herman's orientation parameter of between 0.5 or more. In some instances, the film's parameter can be 0.6 or greater. This achievement provides additional mechanical property advantages over other materials.

For example, the stiffness, which is measured by elastic modulus, for a substantially uniaxial cellulose nanocrystal film can be greater than 30 GPa. In some instances, the elastic modulus may be approximately 60 GPa. By comparison, most polymers have a modulus between 2-4 GPa. Wood and glass can each have a modulus of about 10 GPa and 70-75 GPa, respectively. In other words, the CNC film produced by process 100 can achieve a stiffness of at least half that for glass, and in many instances, within an elastic modulus of 10 GPa of glass. Plus, the film is lighter-weight than glass and can be easier to implement in some commercial settings.

The CNC film can also achieve significant tensile strength. For example, CNC films can achieve 300-350 MPa, whereas 1040 steel has a tensile strength of about 550 MPa. In other words, the tensile strength of the CNC film formed by process 100 is greater than 50% the tensile strength of 1040 steel. Moreover, since the cellulose nanocrystals are plant-biomass-based, the film can be substantially optically clear which may be desirable for certain commercial applications. The CNC film can also have a 2% yield strain-to-failure, which is about 10 times greater than that of glass.

Other non-plant-biomass-based cellulose nanocrystal films may achieve desirable mechanical properties, but these films are generally not commercially applicable. Some of these conventional films are not optically clear and thus have limited utility. On the other hand, the CNC films produced by the industrial-relevant process 100 of the present disclosure are commercially viable and provide many advantages for commercial use.

Additional advantages and improvements of the methods of the present disclosure are demonstrated in the following examples. These examples are illustrative only and are not intended to limit or preclude other embodiments of the present disclosure.

The following examples demonstrate the practice and utility of the present disclosure but are not to be construed as limiting its scope herein. Any suitable laboratory equipment known to those skilled in the art can be utilized to synthesize the cellulose nanocrystals and analyze its properties thereof. To better understand the advantages of the present disclosure, two different water-based colloidal suspensions of cellulose nanocrystals were studied and resulted in cellulose nanocrystals with two distinct particle morphologies. Both suspensions were made by sulfuric acid hydrolysis of softwood-derived microcrystalline cellulose (MCC) provided by FMC BioPolymer (Lattice® NT-020).

The first colloidal suspension was produced at Purdue University, West Lafayette, Ind. Sulfuric acid hydrolysis was used to break down the amorphous material in the MCC powder (63.5 wt. % $H_2SO_4$, 10 to 1 acid to MCC weight ratio, 45° C., 130 minutes) and was immediately quenched 10-fold in deionized water. The suspension was then rinsed five times via centrifugation (Sorvall RC-3C Plus Centrifuge, 6450 RCF), and dialyzed (Fisher Scientific seamless-cellulose dialysis tubing, 4.8 nm pores, 12000+ molecular weight cutoff) against deionized water for 6 days. Finally, the suspension was ultrasonicated (Branson Digital Sonifier 250 ultrasonic horn, 70% power for 21 minutes) to uniformly disperse the cellulose nanocrystals, and centrifuged once more to remove any remaining macroparticles. This processing resulted in a cellulose nanocrystal suspension (hereinafter referred to as "CNC-Long" or "CNC-L") with long, high aspect ratio crystals at a pH of 6.73 as summarized in Table 1 below. This suspension formed a viscous, gel-like state when concentrated to 3.0 wt. % cellulose.

The second colloidal suspension was produced at the United States Department of Agriculture Forest Service-Forest Products Laboratory in Madison, Wis. The second cellulose nanocrystal suspension was produced by sulfuric acid hydrolysis of MCC (64% sulfuric acid, 8 to 1 acid to MCC weight ratio, 45° C., 60 minutes) followed by quenching with deionized water, centrifuge rinsing, washing, and then dialyzed for about a week to remove remaining acid. The second suspension was then ultrasonicated to disperse the cellulose nanocrystals via mechanical agitation and centrifuged a final time for macroparticle removal. This processing resulted in a cellulose nanocrystal suspension (hereinafter referred to as "CNC-Short" or "CNC-S") with shorter crystals at a pH of 2.85, as summarized in Table 1 below. When concentrated to 10.3 wt. % cellulose, the second suspension exhibited a similar viscous, gel-like state as that observed in the first suspension. The differences in suspension processing resulted in several distinct variables, including cellulose nanocrystal size, aspect ratio, and surface charge that allowed comparative testing to be conducted.

After the shearing process, additional cellulose nanocrystal suspension was added between the PET strips, and the shearing process was repeated thereafter. After six shearing passes were completed by the doctor blade, the uniform film was allowed to sit and dry at ambient conditions. Once dry, the film edges in contact with the PET strips were cut away with a razor blade, and the film delaminated from the glass surface.

The variation in suspension concentrations (3.0 wt. % vs. 10.3 wt. %) led to differences in drying behavior. The CNC-S films required approximately 2 hrs to dry, resulting in films approximately 41 μm thick with a slight crescent curvature due to a stress gradient formation during quick drying. The CNC-L films dried in about 5 hours, and resulted in a film thickness of approximately 18 μm, thereby being a nearly perfectly flat film.

The unsheared CNC films were also produced to better understand the effects of random in-plane cellulose nanocrystal orientation with respect to film properties. To prevent orientation induced by pouring and spreading of the suspensions, a more fluid-like suspension was used. Low concentration CNC-L (1.0 wt. %) and CNC-S (1.3 wt. %) suspensions were transferred into flat polystyrene Petri dishes, uniformly filling the dishes half-way, and were left to dry at ambient conditions. Once dry, the resulting films did not delaminate from the substrate and had to be carefully

TABLE 1

Stereological characterization of CNC-S and CNC-L suspensions.

| CNC-S | Length (nm) | Width (nm) | Aspect Ratio | CNC-L | Length (nm) | Width (nm) | Aspect Ratio |
|---|---|---|---|---|---|---|---|
| Mean | 129 | 7.9 | 22 | Mean | 195 | 7.4 | 32 |
| Std. Dev. | 76 | 2.5 | 13 | Std. Dev. | 92 | 2.3 | 16 |
| Min | 24 | 3.2 | 5 | Min | 54 | 3.2 | 8 |
| Max | 440 | 15.2 | 65 | Max | 503 | 19.0 | 73 |

A Philips CM-100 Transmission electron microscope was used to characterize the morphology of individual CNC-L and CNC-S particles. Based on examination of the different particles, the longer CNC-S crystals tended to be agglomerates with multiple crystals lying parallel, while the longer CNC-L crystals were typically single crystals. The average length of the CNC-L crystals was about 195 nm having an aspect ratio of 32, and the average length of the CNC-S crystals was about 129 nm with an aspect ratio of 22.

Two film-casting methods were then used for forming neat films of 100% cellulose nanocrystals. To better understand the effects of shear, the methods were performed with shear and without shear. The sheared cellulose nanocrystal films were produced using tape-casting methods directly onto a glass substrate. The use of glass as a substrate improved adhesion of the film to the surface during drying, and resulted in neat, smooth film surfaces with no evidence of wrinkling. Two shearing rates ($100 \cdot s^{-1}$ and $10 \cdot s^{-1}$) were used to generate films with varying levels of orientation. To produce films of uniform thickness, two polyethylene terephthalate (PET, 0.60 mm thick) strips were attached to the glass casting surface 30 mm apart. Cellulose nanocrystal suspensions (CNC-L—3.0 wt. %, and CNC-S—10.3 wt. %) were pipetted onto the glass substrate between the PET strips. A doctor blade was balanced evenly on the PET strips, spanning the gap to produce an even casting level, and the suspension between the strips was sheared by the doctor blade at set casting rates.

removed from the dishes with a razor blade. These unsheared films contained substantially no wrinkles or curvature, most likely due to the long drying time (several days) and random in-plane orientation of the CNCs. These films also exhibited a thickness gradient, with the thinnest portion (~10 μm thick) along the outer edge, increasing uniformly towards the center of the film (~120 μm thick). Testing strips were therefore cut perpendicular to the film radii, resulting in the least thickness variation possible.

An X-ray diffractometer was used to characterize the cellulose nanocrystal alignment in the cast films. Scans were taken for 1800 seconds each at a distance of 6.080 cm from the detector, with cast films mounted perpendicular to the x-ray beam. Diffracted x-ray intensities were measured with respect to the shearing direction used in casting the films. The intensity distribution after background subtraction of the (200) plane diffraction was used for calculation of a Herman's order parameter, S, for each film, using the following equation:

$$S = \frac{1}{2}(3\langle \cos^2 \gamma \rangle - 1) \qquad (1)$$

where $$\{\cos^2 \gamma\} = 1 - 2\{\cos^2 \phi\} \qquad (2)$$

and $$\{\cos^2\phi\} = \frac{\sum_{\phi=0}^{180} I(\phi)\cos^2\phi\sin\phi\Delta\phi}{\sum_{\phi=0}^{180} I(\phi)\sin\phi\Delta\phi} \qquad (3)$$

in which φ is the azimuthal angle with respect to the film shearing direction at φ=0°, and I(φ) is the (200) plane diffracted intensity at φ.

To determine potential effects of density on mechanical properties, the density of each tensile specimen prepared was measured at 27° C. and 50% relative humidity. The dimensions of each specimen from each sheared and unsheared film were measured with a micrometer and the measurements averaged. The film thicknesses were measured 4-6 times across each film with +/−1 μm precision and averaged. Film widths were measured 3-4 times across each film with +/−5 μm precision and averaged as well. Film lengths could only be measured once with +/−10 μm precision and were most likely the greatest source of variance in measured values. Film masses were measured using a microbalance with +/−1 μg resolution.

A dynamic mechanical analyzer (DMA) was used in controlled force mode to perform tensile tests to determine the elastic modulus, ultimate tensile strength, and elongation at failure of the cellulose nanocrystal films. Both the axial and transverse tensile strips were cut from shear cast films using straight razor blades, with dimensions of approximately 2 mm wide and 15-20 mm long. The film strips were then carefully mounted onto a thin steel-foil (80 μm thick) frame. Superglue (e.g., Loctite® control gel) was used to bond the tensile strip ends to the steel frame assembly and left to cure for about 24 hours before testing. The gage lengths for determining strain were measured with calipers as the distance between steel tabs. Once mounted in the DMA, the steel assembly was cut and the tensile test was performed at 27° C. and 50% relative humidity with a constant load rate of 1.0 N/min and an initial pre-load force of 0.005 N. Five tensile specimens were tested and averaged for each condition.

As described above, X-ray diffraction was used to characterize the cellulose nanocrystal orientation in dried CNC-L and CNC-S films. The area detector scans comparing the different films based on shear rate showed that the intensity of the (200) plane reflection varied as a function of film orientation with respect to sheared casting direction. The randomly-oriented, unsheared cellulose nanocrystal films exhibited a uniform diffraction pattern, with constant intensity at all azimuthal χ angles for any given 2θ peak. As shear rate increased, the oriented cellulose nanocrystals, in particular their oriented (200) planes, diffracted more x-rays in the azimuthal χ angles perpendicular to the shearing direction than in χ angles parallel to the shear direction. The orientations were quantified with Herman's' order parameter, S, and the results are shown in FIG. 2.

Figure 2:
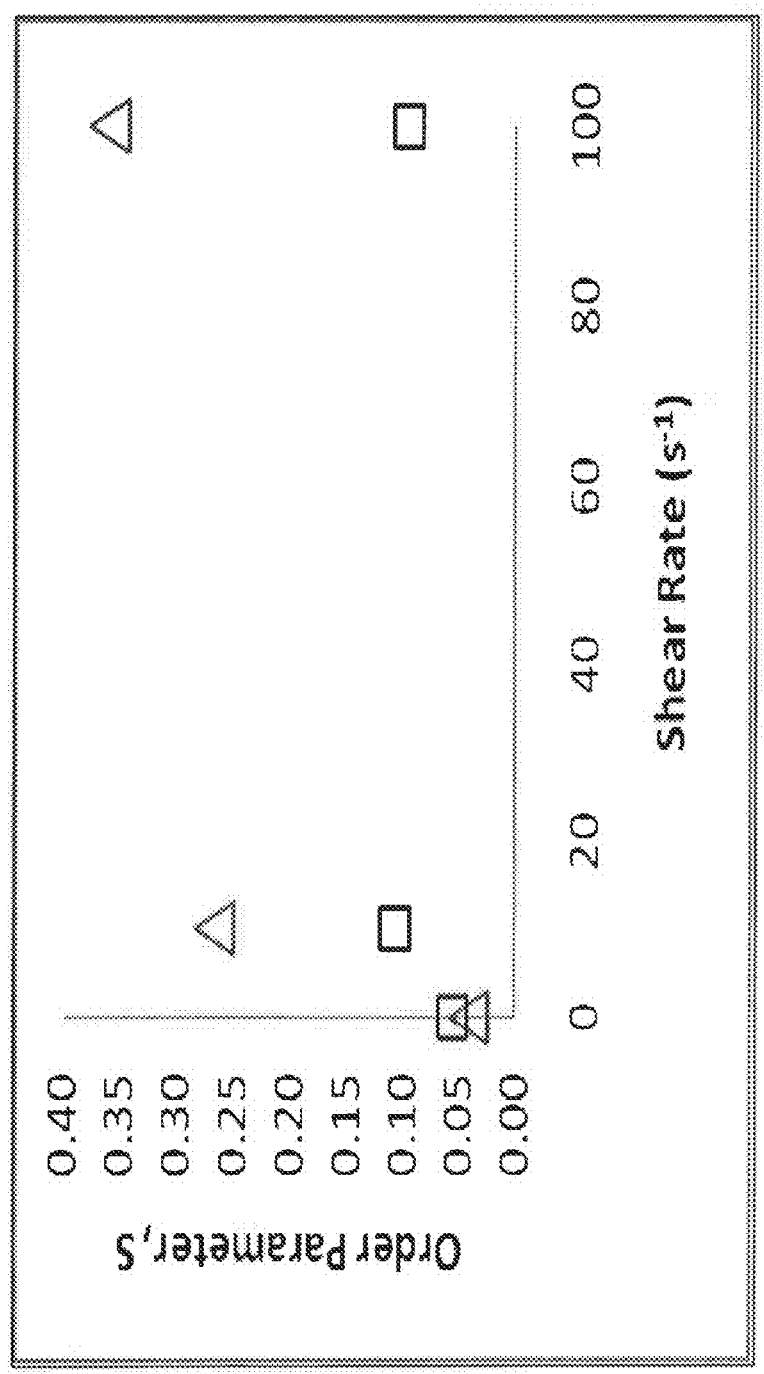
FIG. 2 is a chart showing Herman's order parameters of CNC-S (Δ) and CNC-L (□) films as a function of shear rate.

With reference to FIG. 2, increasing shear rate can increase the retained cellulose nanocrystal orientation in the shear cast films. However, suspension properties including cellulose nanocrystal length and aspect ratio, surface charge, and suspension concentration can dictate the amount of orientation retained, as the CNC-S sheared films were approximately 2-3 times more oriented than the CNC-L sheared films.

In addition, cellulose nanocrystal length and aspect ratio can directly affect shear orientation potential in dried films, both by affecting shear-induced orientation as well as orientation retention after shear ceases. From the results, a low shear rate is able to produce significant orientation in both the CNC-L and CNC-S films, and increased shearing rates may level-off with diminishing returns on orientation. These result are similar to other experimentation, which showed the cellulose nanocrystal order parameter increased linearly with the $\log_{10}$ of shear rate until reaching a plateau near $100 \cdot s^{-1}$. However, the former experimentation also showed a relaxation behavior after shear ceased, in which the degree of cellulose nanocrystal alignment decreased with time. This former experimentation suggested that longer, higher aspect ratio cellulose nanocrystals were able to achieve greater shear-induced orientation and experience less orientation relaxation.

In addition, disparities in the results of prior experimentation and those of the present disclosure suggest an additional influence on orientation, particularly orientation relaxation, most likely caused by surface charge. The relaxation identified in prior experimentation for cellulose nanocrystals with lengths of about 180 nm and an aspect ratio of about 33 (nearly identical to the CNC-L suspension particles of the present disclosure) required only one hour to relax from 0.84 to 0.10 orientation parameter (the same final orientation for CNC-L films), and reached 0.00 orientation after four hours. However, the CNC-L films of the present disclosure required five hours to dry, and therefore retained orientation much longer than crystals of the same aspect ratio as studied in previous experimentations. This is likely a result of an increased surface charge in the CNC-L suspension. This assertion is reinforced by the CNC-L suspension reaching a viscous gel-like state at 3 wt. % while the same aspect ratio CNC suspension tested in previous experiments reached 7.0 wt. % without reaching a gel-like formation, a difference of which can only be explained by excess electrostatic repulsion in the CNC-L suspension.

The CNC-S and CNC-L suspensions and corresponding films exhibited a cross-hatch pattern when viewed through crossed polars. It is likely that, when these suspensions were sheared, the glassy "frozen" microstructure was broken which allowed the cellulose nanocrystals to orient with the shear direction. Once shear ceased, the order was once again "frozen" into position, preventing or limiting any relaxation associated with previous experiments, allowing our films to dry while retaining more of the shear induced orientation.

In comparing the CNC-L and CNC-S films, it was found that the suspension concentration also affects the final orientation of the dried CNC films. Unlike the results of previous experiments, the CNC-S films, with shorter and lower aspect ratio particles than the CNC-L particles, achieved greater orientation than the CNC-L films. At least part of this may be due to differences in suspension drying rate, resulting from differences in cellulose nanocrystal concentration during film processing. In the testing of the colloidal suspensions described in the present disclosure, the CNC-S suspension concentration was three times the CNC-L suspension concentration, and thus dried more rapidly (~2 hours for the CNC-S films vs. ~5 hours for the CNC-L films). If time-dependant relaxation still occurred, then the shorter drying time may result in less relaxation and thus greater retained CNC alignment in dried CNC-S films.

Based on the various measurements and experimentation completed, the following mechanical properties of the CNC films were observed.

Density

The density of each unsheared and $100 \cdot s^{-1}$ sheared tensile specimen was measured to determine any potential influence on mechanical properties. From the measurements, the sheared films were approximate the full density of crystalline cellulose, 1.60 g/cm$^3$, with densities (standard deviations) of 1.57 (0.02) g/cm$^3$ and 1.55 (0.02) g/cm$^3$ for the CNC-L and CNC-S sheared films (100·s$^{-1}$), respectively. The unsheared CNC-L and CNC-S films had densities of 1.38 (0.03) g/cm$^3$ and 1.43 (0.11) g/cm$^3$, respectively. Based on these results, the small size and strong surface interactions of individual cellulose nanocrystals allowed the formation of a dense mat, and the density increased slightly as crystals become more oriented, enabling better packing for highly anisotropic particles.

Elastic Modulus

Figure 4:
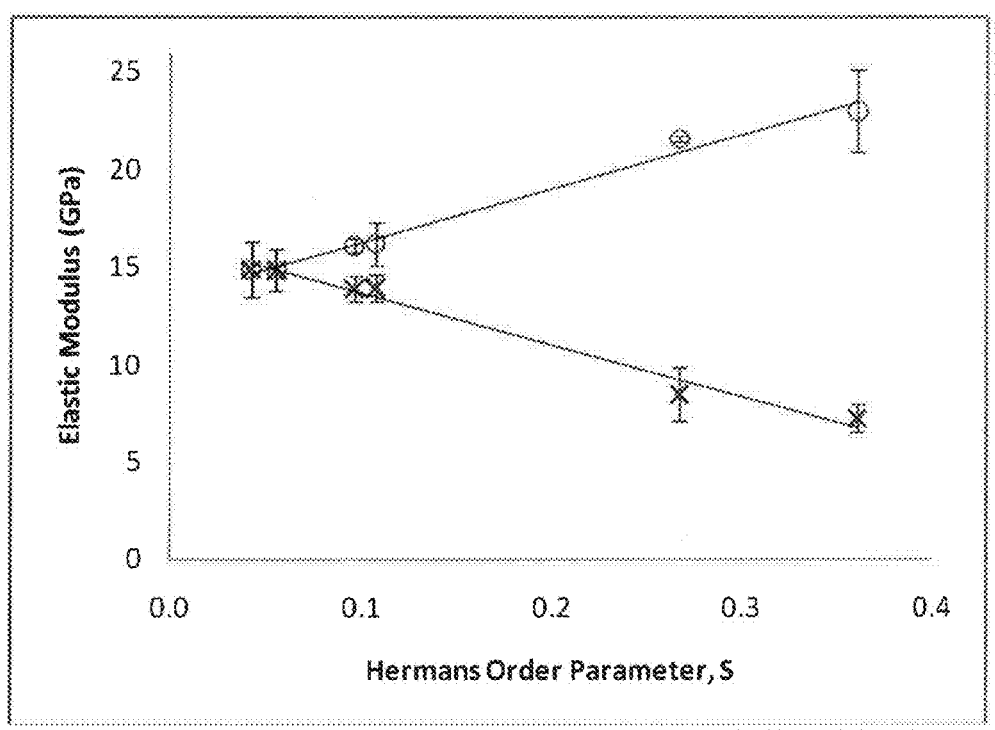
FIG. 4 is a chart of CNC-S and CNC-L axial and transverse elastic moduli in regards to Herman's order parameter.

With reference to FIG. 3, the measured elastic modulus of both CNC-S and CNC-L films are shown. Both the CNC-L and CNC-S unsheared films had random in-plane cellulose nanocrystal orientation. As a result, the axial and transverse directions in the unsheared films exhibited similar elastic moduli (14.9 GPa). Referring to FIG. 4, for the sheared CNC-L and CNC-S films, the axial elastic modulus increased and the transverse elastic modulus decreased with increasing order parameter. Elastic modulus in 100% cellulose nanocrystal films is determined by the elastic stiffness of individual cellulose nanocrystals and is substantially dependent on crystal orientation. Randomly-oriented cellulose nanocrystal films can exhibit an elastic modulus comprised of equal contributions of axial and transverse moduli of individual cellulose nanocrystals. As shear rate increases cellulose nanocrystal orientation in films, the increased fraction of cellulose nanocrystals oriented axially increases the combined modulus towards that of the axial modulus of individual cellulose nanocrystals, and as such the sheared cellulose nanocrystal films exhibit a higher axial modulus than the unsheared films. The measurements showed an increase in axial elastic modulus scaling with an increasing order parameter (from 14.9 GPa at 4-5% orientation to 23 GPa at 36.0% CNC orientation). Therefore, the differences in cellulose nanocrystal length, aspect ratio, and casting suspension concentration do not directly influence the elastic moduli of the films, except for their influence on the retained cellulose nanocrystal orientation.

Tensile Strength and Elongation at Failure

Figures 5A, 5B:
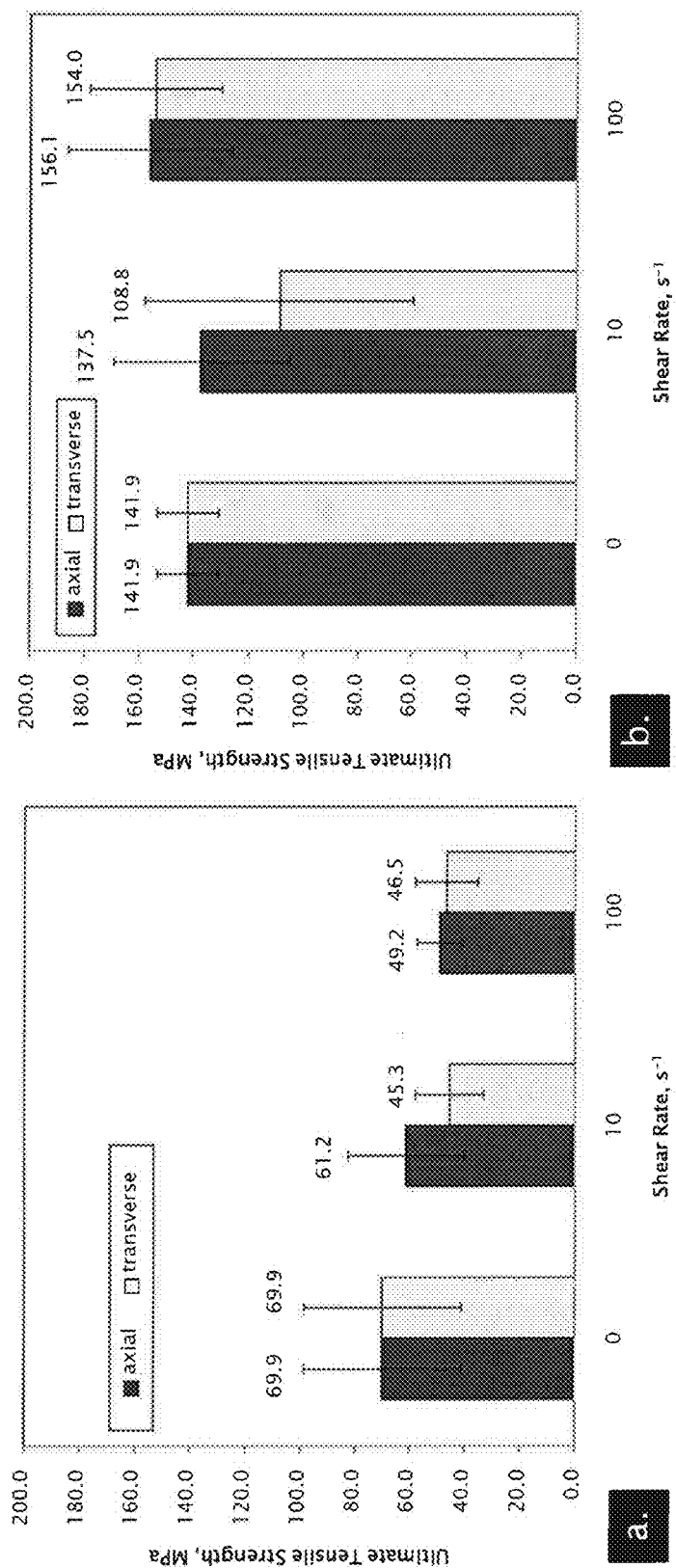
FIGS. 5a and 5b are charts illustrating axial and transverse ultimate tensile strength of (a) CNC-S and (b) CNC-L films with respect to shear rate.
Figure 6A:
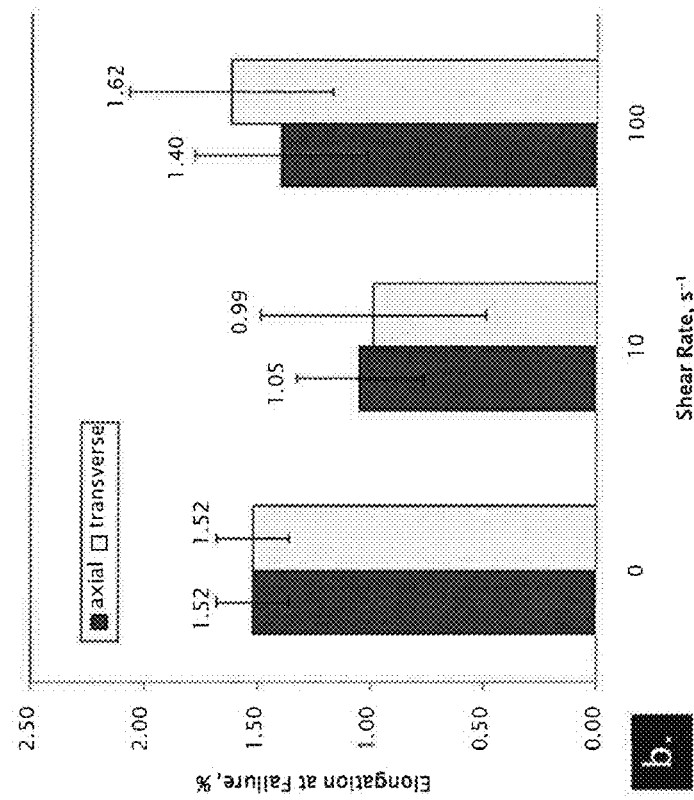
FIGS. 6a and 6b are charts illustrating axial and transverse elongation at failure of (a) CNC-S and (b) CNC-L films with respect to shear rate.
Figure 6B:
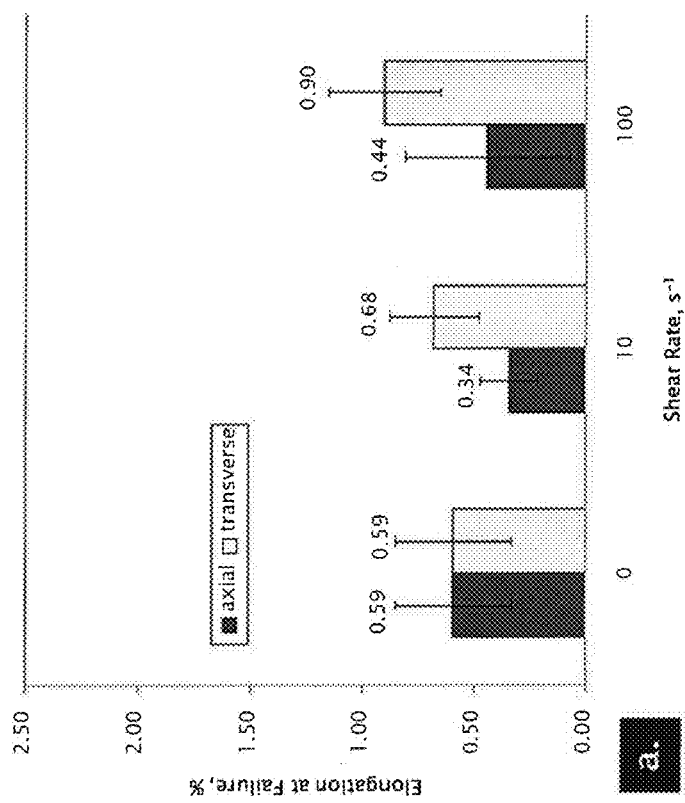

The measured ultimate tensile strength and elongation at failure of both CNC-S and CNC-L films are shown in FIGS. 5 and 6. As opposed to elastic moduli, there can be a large influence of cellulose nanocrystal length and aspect ratio on ultimate tensile strength and elongation in cellulose nanocrystals films. The CNC-S films can have a significantly lower tensile strength and elongation at failure than the CNC-L films (45-70 MPa vs. 110-160 MPa, respectively). Without the use of additional chemical bonding agents, 100% cellulose nanocrystal films gain their strength from interfacial hydrogen bond and van der Waals bond interactions. The same can be seen in cellulose nanocrystal polymer composites, in which the composite strength relies on hydrogen bonding between cellulose nanocrystals as a percolated network in the polymer matrix, as opposed to interactions between cellulose nanocrystals and the matrix.

As uncovered, increasing cellulose nanocrystal length can increase the potential for interfacial overlap between crystals, thereby increasing load distribution potential throughout the film. Shorter cellulose nanocrystal lengths can decrease average load transfer path-length, and thus decrease the tensile strength at failure. Similarly, as orientation increases the interfacial contact between adjacent cellulose nanocrystals (and thus load transfer) in the axial orientation, the ultimate tensile strength can be increased as well. In the transverse direction, however, the tensile strength decreases due to the small cellulose nanocrystal widths resulting in ineffective load transfer in the axial pulling direction, as well as lesser individual crystal strengths in the transverse direction.

Based on the experimentation results, deviations in tensile strength and elongation can result from inherent flaws (surface scratches, nicks, air bubbles) in the cast films as well as interactions with the steel tabbing assembly and tensile clamps (bond line irregularities, clamp compression) which are common when characterizing brittle materials. The highest tensile strength of the CNC-L cast films sheared axially at 100·s$^{-1}$ was 195.66 MPa, reaching 1.94% elongation at failure. The other four specimens followed similar paths during tensile testing. The same occurred with the CNC-S cast films in which the highest tensile strength for the CNC-S cast film sheared at 100·s$^{-1}$ was 58.33 MPa at 0.28% elongation. These flaws obscured the ultimate tensile strength dependence trends expected to result from axial and transverse orientations. However, a clear difference in ultimate tensile strength based on cellulose nanocrystal length and aspect ratio was still observed.

In a further non-limiting example of the present disclosure, the effects of pH on cellulose nanocrystal films was studied. To understand the effects of pH on the cast film properties, acid and base titrations were used to alter the pH of both the CNC-L and CNC-S suspensions. The CNC-L suspension (pH 6.73, 1.0 wt. % CNC's) was acidified to a resulting pH of 1.67 by slowly adding dilute $H_2SO_4$. The suspension was then dialyzed against pure deionized water for 24 hours, increasing the pH to 2.64. This was done to remove excess ions from the suspension while achieving a pH near that of the as-received CNC-S suspension.

The CNC-S suspension (pH 2.85, 1.3 wt % CNC's) was first dialyzed against pure deionized water in an attempt to increase the pH. This was ineffective, however, as the pH did not substantially change after 7 days of dialysis. Droplets of dilute KOH were then slowly added to the suspension to increase the pH to 6.30. The resulting suspension was then dialyzed against pure deionized water for 24 hours to remove excess ions from the suspension. Unexpectedly, the 24 hours of dialysis resulted in a pH decrease from 6.30 to 4.31, thereby suggesting the cellulose nanocrystals in this suspension are inherently acidic. Consequently, more dilute KOH was added to the CNC-S suspension to increase the pH to 6.35, and excess ions were not removed from the suspension.

The processing of neat cellulose nanocrystal films was also performed similar to the previous method described above. All four colloidal suspensions of cellulose nanocrystals (i.e., CNC-L low pH, CNC-L neutral pH, CNC-S low pH, CNC-S neutral pH) were concentrated using a Yamato RE500 rotary evaporator at 20 Torr and 38° C. Each suspension was concentrated to the same viscous, gel-like state as described above. Uniform films were then cast from each suspension on a glass substrate using tape-casting methods with a shear rate of 100·s$^{-1}$. The films were then allowed to dry at ambient conditions before removal from the glass substrate with a razor blade.

X-ray diffraction was used to characterize the effects of pH on film orientation. The intensity variation of the peak diffraction with respect to film casting direction was used to calculate a Herman's order parameter, S, for each of the four films. Each film was then sectioned into five axial and five transverse tensile specimens, all approximately 2 mm wide and 15-20 mm long, and the length, width, and thickness of each strip were carefully measured using a digital micrometer. The film strips were then massed using the microbalance of a thermogravimetric analyzer for subsequent film densities calculations.

Tensile tests were performed to determine the effects of the casting suspension pH on the elastic modulus, ultimate tensile strength, and percent elongation at failure. The axial and transverse tensile strips cut from each of the 4 films were mounted on a thin steel-foil (80 mm thick) assembly as described above. Gage lengths were measured as the distance between bond lines of the steel tabs on each end of the film assembly using calipers. Stress/strain tests were conducted using a TA Instruments Q800 Dynamic Mechanical Analyzer (DMA) in controlled force mode. Tests were performed at 27° C. and 50% relative humidity using a 1.0 N/min load rate.

Based on the measurements and tests performed, the effects of pH provided the following results.

Suspension and Film Processing

Prior to the above-described experimentation, little research had been conducted on the effects of pH on cellulose nanocrystal suspensions and their properties. Conventional cellulose nanocrystal processing methods used acid digestion followed by rinsing and dialysis in order to remove digested cellulose and excess acid. However, it has been found that this is not always enough to change the pH of a cellulose nanocrystal suspension to neutrality. The cellulose nanocrystal suspension produced by CNC-S crystal retains its low pH regardless of rinsing and dialysis steps, and was only capable of being neutralized via the addition of base. Even then, further dialysis in neutral deionized water removed the base, once again dropping the pH of the suspension from 6.30 to 4.31 after only 24 hours. The CNC-S suspension was inherently and unknowingly acidic as a result of its processing.

The effects of pH were first discovered during the processing of the CNC-L suspensions, and in particular, the centrifuge rinsing stage. After quenching the acid digestion reaction, centrifugation was used to pull the nanocrystals out of suspension to allow the acidified water (with digested amorphous cellulose) to be poured off. Conventional processes typically use an ultracentrifuge in excess of 15,000 RPM in order to rinse the suspension 3-5 times, often times in small quantities. However, in the present disclosure, the processing method required larger cellulose nanocrystal yields in order to form solid films of nanocrystals, and thus a large Sorvall RC-3C Plus Centrifuge was used to centrifuge 1.5-3 liters of suspension at once. This device was only capable of reaching 5,000 RPM (6450 RCF), and the suspension was only capable of being rinsed once before the supernatant remained turbid despite further centrifugation.

It was found that decreasing the suspension pH below 1.45 with $H_2SO_4$ resulted in substantially no turbidity after centrifugation for 15 minutes at 5000 RPM. This allowed 5 rinsing steps to be used, which is essential for removing all digested cellulose from the suspension, while maintaining maximum cellulose nanocrystal yield. The excess acid was easily removed through dialysis and did not present a problem. This provides insight into the potential effects pH might have on cellulose nanocrystal suspensions.

CNC Suspension Concentration

The first impact on varying the pH of the cellulose nanocrystal suspensions was apparent when concentrating the suspensions for film casting. The neutral CNC-L suspension (pH=6.73) reached a viscous, gel-like state at 2.95 wt. % CNC's, in which the suspension would slide very slowly as a stable mass along the wall of a glass round bottomed flask when tilted. When the pH of this same suspension was reduced to 2.64, it did not achieve the same gel-like state until concentrated to 5.50 wt. %. The same trend was noticed for the CNC-S suspension. The low pH CNC-S suspension reached a viscous, gel-like state at 10.34 wt. %, and when the pH of that same suspension was increased to 6.35, the suspension reached the same gel-like state at a concentration of only 7.50 wt. %. Accordingly, the low pH suspensions of cellulose nanocrystals were able to condense more, thereby suggesting that acidity is screening the cellulose nanocrystal surface charge repulsion potential. Based on the embodiments described above, this increased cellulose nanocrystal packing allowed for more oriented cast films, as the higher concentration suspensions dry faster, retaining more orientation induced by tape-casting.

Shear Orientation

The x-ray diffraction area scans on the four shear-oriented films varied with respect to pH. Qualitatively, an increase in diffraction intensity was seen as the casting suspension pH was increased to neutrality for both the CNC-L films (referred to as PU films) and CNC-S films (referred to as FPL films). Quantitatively, in Table 2 below, the Herman's order parameters calculated from the (200) plane diffraction for each film showed an increase in orientation (63% increase for PU films, 48% increase for FPL films) simply by increasing casting suspension pH to neutrality.

TABLE 2

Herman's order parameters of CNC-L and CNC-S films as a function of pH and sheared at $100 \cdot s^{-1}$.

| Film | High/Low pH | Herman's order parameter ($S_H$) |
| --- | --- | --- |
| CNC-L Film | Low pH | 0.059 |
| CNC-L Film | Neutral pH | 0.096 |
| CNC-S Film | Low pH | 0.360 |
| CNC-S Film | Neutral pH | 0.533 |

The shear orientation results obtained contradicted expectations, as the neutral pH suspensions were less concentrated, and as a result took longer to dry. It therefore seems that pH has a more influential effect on suspension orientation retention, or that it allows higher orientation levels to be achieved during shearing which cannot be counteracted by concentration dependant drying rate differences. As to the difference in orientation between CNC-L and CNC-S suspensions, it became apparent that suspension concentration may not be a dominating factor. Instead, orientation may likely be determined by the length, aspect ratio, length polydispersity, and surface charge of the individual cellulose nanocrystals.

Density and Tensile Properties

The average density of the CNC-L low pH, CNC-L Neutral pH, CNC-S low pH, and CNC-S neutral pH films are shown in Table 3 below. The calculated porosity percentages are based on a 1.58 $g/cm^3$ average true density for cellulose. The suspension pH did not substantially affect film density. Instead, based on similar results as described above, films with very little to no orientation have a lower density than films with orientation. The change is minor, and seems to level-off after a small amount of orientation is achieved, at which point all films seem to be near the true density of cellulose. Changing the casting suspension pH affects orientation retention, but the effect on film density is only noticed for the lesser-oriented CNC-L films.

TABLE 3

Average density measurements and corresponding standard deviations of CNC-L and CNC-S films cast from suspensions with varied pH, sheared at $100 \cdot s^{-1}$

| Sample Type | pH Level | Density (g/cm³) | σ (g/cm³) | Porosity (%) |
|---|---|---|---|---|
| CNC-L Sheared Film | Low | 1.45 | 0.05 | 8.0 |
| CNC-L Sheared Film | Neutral | 1.57 | 0.02 | 0.6 |
| CNC-S Sheared Film | Low | 1.55 | 0.02 | 2.0 |
| CNC-S Sheared Film | Neutral | 1.55 | 0.02 | 1.7 |

Figure 7:
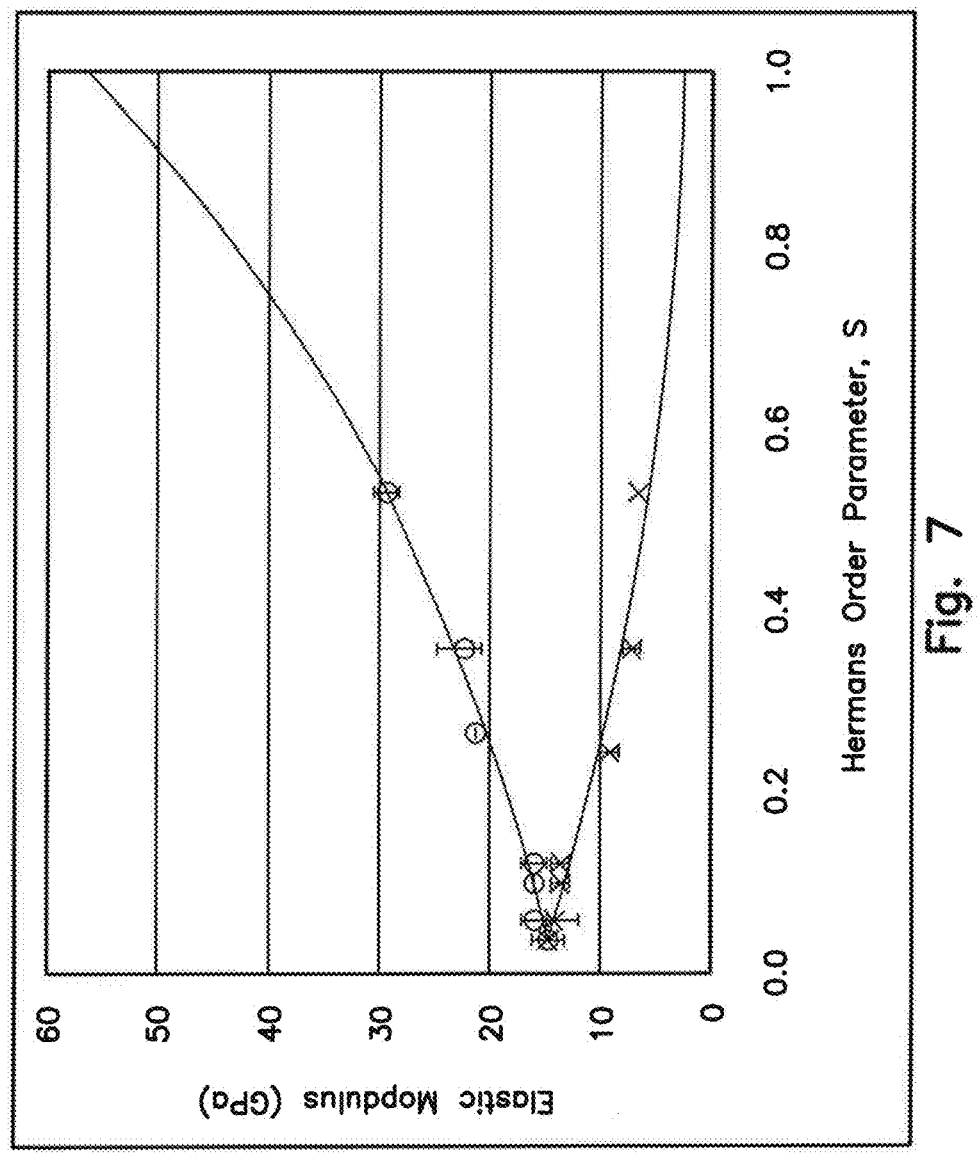
FIG. 7 is a graphical illustration of CNC-S and CNC-L axial (○) and transverse (X) elastic moduli with respect to Herman's order parameter.

The results of the tensile tests on films cast from suspensions with varying pH are shown in Table 4 below. Based on the results described above, the elastic modulus of the films can be dependent on orientation parameter, and that suspension pH or cellulose nanocrystal properties are inconsequential. The linear trend between elastic modulus and order parameter, based on these and previous results, continues in the axial direction as the CNC-S neutral pH-films reach almost 30 GPa, which is equivalent to that of high-strength concrete (in compression). Referring to FIG. 7, if the trend is forecast to an order parameter of 1.00 (e.g., 100% uniaxially oriented CNC film), the maximum estimated potential elastic modulus for the cellulose nanocrystal films produced would be 43 GPa, which is equivalent to the elastic modulus of magnesium metal and more than half the modulus of aluminum metal. The elastic modulus of the randomly-oriented unsheared CNC films described above in this disclosure is 14.9 GPa, which is almost exactly one third the estimated modulus of 43 GPa for a perfectly oriented film.

While there may not be a direct effect of suspension pH on cast film elastic modulus, there did appear to be a decrease in ultimate tensile strength and thus percent elongation as pH decreases. The failure of the tensile films produced was dominated by surface defects, which was reflected in the large standard deviations for tensile strength and elongation. There was a decrease in the average tensile strength and percent elongation as pH decreased.

TABLE 4

Tensile properties and corresponding one standard deviation (STD) of CNC-L and CNC-S films cast from suspensions with varying pH.

| Film | Elastic modulus (GPa) | STD (GPa) | Ultimate tensile strength (MPa) | STD (MPa) | Elongation at failure (%) | STD (%) |
|---|---|---|---|---|---|---|
| CNC-L Neutral pH, Axial | 16.10 | 0.36 | 156.11 | 30.26 | 1.40 | 0.38 |
| CNC-L Low pH, Axial | 16.12 | 1.04 | 133.04 | 15.85 | 1.13 | 0.16 |
| CNC-L Neutral pH, Transverse | 13.88 | 0.63 | 153.98 | 24.26 | 1.62 | 0.45 |
| CNC-L Low pH, Transverse | 14.44 | 2.33 | 127.56 | 6.46 | 1.27 | 0.34 |
| CNC-S Low pH, Axial | 22.99 | 2.08 | 49.20 | 8.00 | 0.44 | 0.37 |
| CNC-S Neutral pH, Axial | 29.65 | 1.16 | 77.33 | 10.02 | 0.30 | 0.06 |
| CNC-S Low pH, Transverse | 7.22 | 0.72 | 46.48 | 11.32 | 0.90 | 0.25 |
| CNC-S Neutral pH, Transverse | 6.73 | 0.21 | 47.69 | 2.46 | 0.85 | 0.15 |

In another non-limiting example of the present disclosure, the effects of the oriented films were also used in a heat treatment study. The resulting films from tape-casting the CNC-L neutral pH suspension, CNC-S low pH suspension, and CNC-S neutral pH suspensions at a shear rate of $100 \cdot s^{-1}$ were previously characterized and described above. In addition, two non-oriented films were cast from the CNC-L neutral pH and CNC-S low pH suspensions for the heat treatment study. These two suspensions were diluted with pure deionized water to a fluid state (1.0 wt. % CNC's for the CNC-L suspension, and 1.3 wt. % CNC's for the CNC-S suspension), allowing Brownian motion to provide a random orientation. The suspensions were then transferred into flat polystyrene Petri dishes. The fluid suspensions were allowed to dry into thin films at ambient conditions before being removed from the bottom of the polystyrene Petri dishes with a razor blade.

Five axial and five transverse tensile strips were cut from the CNC-L neutral pH, CNC-S low pH, and CNC-S neutral pH sheared films. An additional five tensile strips were cut from the non-oriented CNC-S low pH and CNC-L neutral pH films. Using similar procedures as in the pH experimentation, the thickness, width, and length of each strip were measured using a micrometer, and the mass of each strip was measured using the microbalance of a thermogravimetric analyzer. Each tensile strip was then heated in a calibrated lab oven at 85° C. for 24 hours. The specimens were then allowed to re-equilibrate to ambient conditions (27° C. and 50% relative humidity) for 24 hours. Once equilibrated, the dimensions and mass of each tensile strip were re-measured to determine the physical effects of heat treating the CNC films. The strips were then mounted on thin steel-foil support assemblies and tensile tested using the same methods described above with regards to the pH example.

Based on the various measurements and experimentation completed, the following mechanical properties of the CNC films were observed.

Physical Effects

The heat treat study of heating the different cellulose nanocrystal films produced several notable physical effects. First, heating the films caused a decrease in length, width, thickness, and mass, which may be the result of excess water trapped within the cellulose nanocrystal network being released, allowing the film to compact to near full density. The heat treat effects on film densities are shown below in Table 5.

TABLE 5

Average density measurements of CNC-L and CNC-S films before and after heating for 24 hours at 85° C.

| Sample | Density (g/cm³) | Porosity (%) |
|---|---|---|
| CNC-L Neutral pH Sheared | 1.57 | 0.4 |
| CNC-L Neutral pH Sheared, Heated | 1.64 | −3.5 |
| CNC-L Neutral pH Unsheared | 1.38 | 12.8 |

TABLE 5-continued

Average density measurements of CNC-L and CNC-S films before and after heating for 24 hours at 85° C.

| Sample | Density (g/cm³) | Porosity (%) |
|---|---|---|
| CNC-L neutral pH Unsheared, Heated | 1.46 | 7.5 |
| CNC-S Low pH Sheared | 1.55 | 2.0 |
| CNC-S Low pH Sheared, Heated | 1.52 | 3.7 |
| CNC-S Low pH Unsheared | 1.43 | 9.4 |
| CNC-S Low pH Unsheared, Heated | 1.44 | 8.6 |
| CNC-S Neutral pH Sheared | 1.55 | 1.7 |
| CNC-S Neutral pH Sheared, Heated | 1.55 | 1.8 |

Even though the cellulose density in the films increased, there was minimal change in the measured densities. This is partly due to the similar densities of water and cellulose, and thus water mass loss from heating is almost entirely counteracted by the decrease in physical dimensions. There was some error introduced when attempting to measure changes in film thickness with a micrometer. Overall, an increase in cellulose density as a result of heating is expected but for some of the measurement error uncovered during the experimentation.

Another effect of heating the films, in particular the low pH CNC-S films, was browning caused by heating residual sulfuric acid.

Tensile Properties

The effects of heat treatment for 24 hours at 85° C. on elastic modulus, ultimate tensile strength, and percent elongation at failure for the CNC-L neutral pH sheared and unsheared films, CNC-S low pH sheared and unsheared films, and the CNC-S neutral pH sheared films are shown in Table 6 below.

TABLE 6

Tensile properties of CNC-L and CNC-S films before and after heating for 24 hours at 85° C.

| Film | Elastic modulus (GPa) | Ultimate tensile strength (MPa) | Elongation at failure (%) |
|---|---|---|---|
| CNC-L Neutral pH Sheared, Axial | 16.10 | 156.11 | 1.40 |
| CNC-L Neutral pH Sheared, Axial Heated | 19.82 | 194.18 | 1.54 |
| CNC-L Neutral pH Sheared, Transverse | 13.88 | 153.98 | 1.62 |
| CNC-L Neutral pH Sheared, Transverse, Heated | 16.14 | 169.38 | 1.67 |
| CNC-L Neutral pH Unsheared | 14.86 | 141.86 | 1.52 |
| CNC-L Neutral pH Unsheared, Heated | 18.08 | 126.66 | 1.13 |
| CNC-S Low pH Sheared, Axial | 22.99 | 49.20 | 0.44 |
| CNC-S Low pH Sheared, Axial, Heated | 24.95 | 65.71 | 0.30 |
| CNC-S Low pH Sheared, Transverse | 7.22 | 46.48 | 0.90 |
| CNC-S Low pH Sheared, Transverse, Heated | 6.42 | 34.16 | 0.60 |
| CNC-S Low pH Unsheared | 14.88 | 69.87 | 0.59 |
| CNC-S Low pH Unsheared, Heated | 14.55 | 57.73 | 0.49 |
| CNC-S Neutral pH Sheared, Axial | 29.65 | 77.33 | 0.30 |
| CNC-S Neutral pH Sheared, Axial, Heated | 31.08 | 104.41 | 0.43 |
| CNC-S Neutral pH Sheared, Transverse | 6.73 | 47.69 | 0.85 |
| CNC-S Neutral pH Sheared, Transverse, Heated | 6.97 | 36.13 | 0.63 |

In the previous pH tests, it was shown that elastic modulus scales linearly with orientation, and that other suspension/individual cellulose nanocrystal properties do not affect the elastic modulus. Heat, however, did increase the base elastic modulus of all axial cellulose nanocrystal films regardless of orientation. However, heat did not increase the modulus of the transverse specimens of oriented films.

There were two exceptions to these trends noticed in the results: (1) the elastic modulus for the CNC-L neutral pH transverse films increased with heat, and (2) the elastic modulus of the CNC-S low pH unsheared films did not increase. However, because the CNC-L neutral pH films had such a low orientation parameter, there were likely sufficient cellulose nanocrystals oriented in the axial direction to provide a modulus increase with heating, even for the transverse specimens. The second exception, i.e., the CNC-S low pH films, may have been caused by browning of the low pH film, in which acid degradation of the cellulose nanocrystals resulted in a lower modulus.

In terms of tensile strength and percent elongation, heating the cellulose nanocrystal films also caused a substantial increase in axial properties but not transverse properties. This is, however, difficult to prove due to the influence of surface flaws and imperfections within the films that result in early failure. Each tensile specimen for an individual film did, however, follow the same test profile, and each failed at a different strength along the same profile curve based on critical flaw size. Therefore, if only maximum tensile strengths are considered (e.g., see Tables 7 and 8 below), heating caused a large increase in the potential tensile strength for all axial films (40-80 MPa), and little to no change in potential tensile strength for all transverse and unsheared films.

TABLE 7

Maximum observed tensile strengths of CNC-L and CNC-S axial films before and after heating for 24 hours at 85° C.

| Film Type | Sheared or Unsheared | pH Type | Max Ultimate Tensile Strength (MPa) |
|---|---|---|---|
| CNC-L, Before Heat | Sheared | Neutral | 195.66 |
| CNC-L, After Heat | Sheared | Neutral | 235.57 |
| CNC-S, Before Heat | Sheared | Low | 58.32 |
| CNC-S, After Heat | Sheared. | Low | 94.62 |
| CNC-S, Before Heat | Sheared | Neutral | 89.79 |
| CNC-S, After Heat | Sheared | Neutral | 173.50 |

TABLE 8

Maximum observed tensile strengths of CNC-L and CNC-S transverse films before and after heating for 24 hours at 85° C.

| Film Type | Sheared or Unsheared | pH Type | Max Ultimate Tensile Strength (MPa) |
|---|---|---|---|
| CNC-L, Before Heat | Sheared | Neutral | 175.04 |
| CNC-L, After Heat | Sheared | Neutral | 194.03 |
| CNC-L, Before Heat | Unsheared | Neutral | 159.40 |
| CNC-L, After Heat | Unsheared | Neutral | 164.01 |
| CNC-S, Before Heat | Sheared | Low | 56.55 |
| CNC-S, After Heat | Sheared | Low | 44.17 |
| CNC-S, Before Heat | Unsheared | Low | 93.81 |
| CNC-S, After Heat | Unsheared | Low | 82.42 |
| CNC-S, Before Heat | Sheared | Neutral | 50.70 |
| CNC-S, After Heat | Sheared | Neutral | 46.75 |

There are many advantages of the described embodiments in this disclosure. The cellulose nanocrystal films are industry-friendly as these are made from plant-biomass-based extractions. A doctor blade is used to shear and orient the crystals in a single direction. In the end, dry 100% cellulose nanocrystals are formed with an improved modulus and strength. Also, pH of the liquid suspensions can improve the orientation of the crystals.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of forming a substantially uniaxially-oriented, high content cellulose nanocrystal film for a commercial application, the method comprising:
   providing a cellulose nanocrystal suspension derived from plant-biomass-based material, where a concentration of the cellulose nanocrystals in the suspension is above a lyotropic limit;
   adjusting the pH of the suspension to a substantially neutral pH;
   shearing the neutralized suspension at a defined shearing rate using a doctor blade so as to substantially uniaxially orient the nanocrystals;
   removing water from the sheared cellulose nanocrystal suspension; and
   forming a cellulose nanocrystal film having the substantially uniaxial orientation.

2. The method of claim 1, further comprising adding a hydrophobic agent to the suspension.

3. The method of claim 2, wherein the hydrophobic agent comprises an epoxydyzed soybean oil or elastomer material.

4. The method of claim 1, further comprising controlling the viscosity of the suspension by providing the suspension with a concentration of the cellulose nanocrystals between about 3 wt. % and 15 wt. %.

5. The method of claim 1, wherein the adjusting step comprises adding a base material to the suspension.

6. The method of claim 5, wherein the base material comprises sodium hydroxide, potassium hydroxide, or ammonium hydroxide.

7. The method of claim 1, wherein the removing step comprises:
   cooling the sheared cellulose nanocrystal suspension to a temperature at or above its freezing point; and
   applying a vacuum to the cooled suspension for a period of time,
   wherein the period of time is minimized to maintain the orientation of the cellulose nanocrystals in the formed film.

8. The method of claim 1, wherein the shearing rate is between about $100 \cdot s^{-1}$ and $10 \cdot s^{-1}$.

9. The method of claim 1, wherein the Herman's order parameter of the formed cellulose nanocrystal film is about 0.5 or greater.

10. The method of claim 1, wherein the formed cellulose nanocrystal film comprises a tensile strength between about 250-350 MPa.

11. The method of claim 1, wherein the formed cellulose nanocrystal film comprises an elastic modulus between about 30-60 GPa.

12. The method of claim 1, the formed cellulose nanocrystal film comprises a strain-to-failure yield of approximately 10 times greater than that of glass.

13. The method of claim 1, wherein the suspension is provided in a liquid crystalline form.

14. The method of claim 1, wherein the forming step comprises forming a substantially flat and continuous film.

* * * * *